United States Patent [19]

Handl

[11] Patent Number: 5,118,345

[45] Date of Patent: Jun. 2, 1992

[54] COMPOSITION FOR THE PREPARATION OF PENCIL LEAD

[75] Inventor: Werner Handl, Altdorf, Fed. Rep. of Germany

[73] Assignee: J.S. Staedtler GmbH & Co., Nuremberg, Fed. Rep. of Germany

[21] Appl. No.: 620,063

[22] Filed: Nov. 21, 1990

Related U.S. Application Data

[62] Division of Ser. No. 420,347, Oct. 12, 1989, abandoned.

[30] Foreign Application Priority Data

Nov. 14, 1989 [DE] Fed. Rep. of Germany ....... 3835241

[51] Int. Cl.⁵ .............................................. C09D 13/00
[52] U.S. Cl. ...................................... 106/19; 501/146
[58] Field of Search ........................... 106/19; 501/146

[56] References Cited

U.S. PATENT DOCUMENTS

| | | | |
|---|---|---|---|
| 203,549 | 5/1878 | Lanstrom | 106/19 |
| 1,528,908 | 3/1925 | Bleininger | 501/146 |
| 3,725,100 | 4/1973 | Lentz | 501/146 |
| 4,209,332 | 6/1980 | Tsujio | 106/19 |

FOREIGN PATENT DOCUMENTS

| | | |
|---|---|---|
| 1243305 | 6/1967 | Fed. Rep. of Germany . |
| 3835241 | 5/1989 | Fed. Rep. of Germany . |
| 55-18271 | 5/1980 | Japan . |
| 216420 | 5/1924 | United Kingdom ................. 106/19 |

*Primary Examiner*—William R. Dixon, Jr.
*Assistant Examiner*—Margaret V. Einsmann
*Attorney, Agent, or Firm*—Akoo-Toren

[57] ABSTRACT

A method and composition are disclosed for the preparation of pencil lead from clay, graphite and optionally other material, wherein the clay or the clay/graphite mixture is digested with water, pressed, dried and fired, and at least one alkali phosphate, alkali borate and/or alkali carbonate is added before or as part of the digestion of the clay or the clay/graphite mixture.

6 Claims, No Drawings

COMPOSITION FOR THE PREPARATION OF PENCIL LEAD

This is a division of application Ser. No. 07/420,347 filed Oct. 12, 1989 abandoned.

BACKGROUND OF THE INVENTION

This invention is directed to a method and composition for the preparation of fired pencil lead and to the resultant fired pencil lead product. More particularly this invention concerns pencil lead of high strength, prepared from a readily moldable composition which has optimum wet and dry strengths.

Known pencil leads consist essentially of graphite and clay; the ratio of graphite to clay determines the hardness of the lead. Usually, the clay, which is obtained in mining operations, is washed, that is, suspended in an excess of water and milled if necessary, mixed with graphite and processed by means of filter presses into filter cakes. The filter cakes are dried and brought to a pressable consistency with water in Z kneaders. So-called pressing aids, such as cellulose ethers or polyglycols, are added as required. These additional components generate appropriate wet and dry strengths, since the pure lead-graphite mixture, when pressed into a lead approximately 2 to 2.5 mm. thick, would be too unstable and too difficult to handle. However, these additional components have the disadvantage of exerting an effect on the wet and dry strengths, but not on the final strength of the fired lead.

In some cases, there is even interference with the ceramic bonding due to the development of excessive porosity.

It is also disadvantageous that the organic additives burn away during the firing process and lead to considerable contamination of the environment. Moreover, such additives are ineffective with respect to the rapid digestion of the clay.

In German Auslegeschrift 1,243,305, a mixture of alkaline earth bentonite, kaolin and graphite is proposed for the preparation of pencil lead. Admittedly, it was possible to do without organic additives here for improving the wet and dry strengths; however, the preparation of the mixture is very time consuming, particularly since the alkaline earth bentonite must be allowed to swell for a long time in order to achieve the desired result. Moreover, relatively high firing temperatures are necessary and compared to conventional clay formulations, the mixture is very expensive.

SUMMARY OF THE INVENTION

It is an object of the invention to digest mined clay within a few minutes without an excess of water; that is, to swell it and to obtain in admixture with graphite, a readily moldable composition which has optimum wet and dry strengths.

It is also an object of the invention to provide pencil lead of high strength at relatively low firing temperatures.

Another object of the invention is the provision of a composition for the preparation of pencil lead which is readily moldable, has optimum wet and dry strengths and by means of which, pencil lead of high strength is obtained economically.

These objects and others are accomplished by the invention, according to which, at least one alkali phosphate, borate and/or carbonate is added to the clay or to a mixture of clay and graphite during the digestion thereof with water or prior to the addition of water thereto.

It has been discovered that a mixture of graphite powder, clay and water containing 0.1 to 20% by weight of at least one alkali phosphate, borate and/or carbonate has very desirable properties for the preparation of pencil lead.

Description of the Invention

According to the invention, mined, dried, ground and sifted clay, with a particle size of less than 10 microns, is mixed in a high-speed mixer with graphite powder, an alkali phosphate, alkali borate and/or carbonate and subsequently treated with water. Alternatively, water in which the alkali phosphate, borate and/or carbonate is dissolved is added to the clay or to an intimate mixture of graphite and clay prepared in a high-speed mixer. In this procedure, the clay is digested without an excess of water, that is, directly in the amount of water required for the pressing process.

The inventive mixture is composed of:
a) 15 to 70% by weight of graphite powder,
b) 3 to 60% by weight and more preferably, 3 to 41% by weight of finely ground fire clay,
c) 0.1 to 20% by weight of alkali phosphate(s), alkali borate(s) and/or alkali carbonate(s),
d) 3 to 50% by weight of water, as well as
e) 0 to 35% by weight of other materials such as carbon black.

Alkali phosphates, borates or carbonates which are incorporated in the pencil lead composition according to the invention include, for example, sodium polyphosphate, potassium polyphosphate, sodium tetraborate, sodium carbonate and potassium carbonate, lithium carbonate, sodium metaborate, potassium tetraborate and potassium metaborate.

By mixing the clay intensively with graphite, large agglomerates are broken up by mechanical forces, so that the clay particles have a large, free, accessible and active surface. Moreover, an optimum, statistical distribution of the graphite and clay particles is achieved. By the addition of alkali phosphates, borates and/or alkali carbonates and their solution in water, the multivalent cations of the clay are inactivated by sequestration and replaced by univalent ions. For example, when alkali phosphates are used, the solution gives off alkali ions, so that the highly charged anion

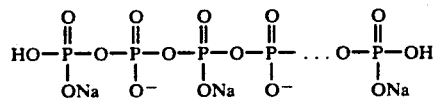

results. The negative charge on this anion becomes greater in proportion to the number of sodium ions that have dissociated; finally the negative charge becomes so high, that all remaining sodium ions are firmly held and lose their mobility. If a multivalent positively charged cation now comes into a contact with such a highly negatively charged anion, it is attracted more strongly, in proportion to its higher charge, than the singly charged sodium ions; that is, the multicharged, positive cations take the place of the displaced sodium ions and are firmly bound in proportion to their higher charge and the clay particles are wetted.

If alkali carbonates or borates are used, the multivalent cations of the clay are converted into water insoluble carbonates or borates. The hydroxyl ions formed by the hydrolysis of the carbonate or borate ion are absorbed at the positively charged edges of the clay particle. This leads to partial wetting.

In both cases, the clay is digested and swelled within a few minutes. The amount of water for this can be limited to that required for the further processing.

The following examples further illustrate the best mode currently contemplated for carrying out the invention. However the examples must not be construed as limiting the invention in any manner.

EXAMPLE 1

Graphite powder (66.0 kg.), with a carbon content of 96% and a particle size of less than 10 microns, and 34 kg. of finely ground fire clay, with a particle size of less than 10 microns, are intensively mixed in a high-speed mixer. Subsequently, while continuing the mixing process, 22 liters of an aqueous solution of 0.8 kg. of sodium polyphosphate with an average chain length and 1.6 kg. of sodium tetraborate. $10H_2O$ are added. After a few minutes, the clay digestion commences with the formation of granulate. The clay/graphite mixture has a moisture content of 18% and is subsequently pressed in a conventional commercial extrusion press into 2.3 mm. thick pencil leads. The leads have a very good wet breaking strength. The leads, cut to the appropriate length, are dried at a temperature between 100° and 150° C. and subsequently fired at 800° C. in an inert or reduced atmosphere.

EXAMPLE 2

Graphite powder (60 kg.), with a carbon content of 96% and a particle size of less than 10 microns, and 40 kg. of finely ground fire clay, with a particle size of less than 10 microns, are premixed dry as in Example 1. During the mixing process, 20 liters of an aqueous solution of 0.8 kg. of sodium polyphosphate are added. The further processing is as in Example 1.

EXAMPLE 3

Graphite powder (60 kg.), with a carbon content of 96% and a particle size of less than 10 microns, and 40 kg. of finely ground fire clay, with a particle size of less than 10 microns, are premixed dry as in Example 1. During the mixing process, 20 liters of an aqueous solution of 1.2 kg. of sodium polyphosphate with an average chain length are added. The further processing is as in Example 1.

EXAMPLE 4

Graphite powder (50 kg.), with a carbon content of 96% and a particle size of less than 10 microns, and 50 kg. of finely ground fire clay, with a particle size of less than 10 microns, are mixed dry with 0.8 kg. of sodium polyphosphate (average chain length) and 1.3 kg. of sodium tetraborate. $10H_2O$ in a high-speed mixer. While continuing the mixing process, 20 liters of water are added. The further processing is as in Example 1.

EXAMPLE 5

Graphite powder (66 kg.) with a carbon content of 96% and a particle size of less than 10 microns, and 34 kg. of finely ground fire clay, with a particle size of less than 10 microns, are mixed dry with 1.0 kg. of sodium polyphosphate (average chain length) and 1.5 kg. of lithium carbonate in a high-speed mixer. The further processing is as in Example 4.

It has been ascertained that sodium polyphosphate with an average to long chain structure is particularly suitable for digesting the clay. Likewise, it has been ascertained that sodium tetraborate distinctly improves the clay plasticity and thus the wet breaking strength and reduces the sintering temperatures of the clay. This can be explained on the basis of a flux action and with that, on the basis of the formation of a melt phase. It is thus possible to produce lead using distinctly lower firing temperatures without lowering its strength.

The advantages of the invention are made even clearer by comparison with the conventional methods for preparing pencil lead.

COMPARISON EXAMPLE A

Thirty-five parts by weight of a clay mixture of calcium bentonite and kaolin in the ratio of 6:4 parts by weight is mixed with 65 parts by weight of powdered graphite, made into a paste with water, concentrated, dried and fired.

COMPARISON EXAMPLE B

With Organic Additives

In a basin with stirrer, 20% by weight of clay are washed in 80% by weight of water. After this cleaning process and an optional fractionation process (hydrocyclone), the clay content is determined. By stirring graphite powder into the aqueous clay slip, the ratio of graphite to clay is adjusted to a value of 1:0.5. The mixture is concentrated in filter presses to filter cakes. The dried filter cakes are comminuted in a Z kneader, adjusted to a pressing consistency with 16% by weight of water and plasticized with 2% polyglycol having a molecular weight of 6,000. If necessary, the composition is rolled and then pressed and fired into pencil lead in the known manner.

TABLE 1

| Comparison of Illustrative and Comparative Examples | | | | | | | |
|---|---|---|---|---|---|---|---|
| | Illustrative Examples | | | | | Comp. Examples | |
| | 1 | 2 | 3 | 4 | 5 | A | B |
| Water excess | no | no | no | no | no | yes | yes |
| Organic additives | no | no | no | no | no | no | yes |
| Open porosity of the lead in % | 9 | 8 | 8 | 5 | 8 | 10 | 15 |
| Wet breaking strength (sample broken by hand) | high | high | high | high | high | average | slight |
| Firing temperature needed °C. | 800 | 800 | 800 | 800 | 800 | 1000 | 1000 |
| Final strength (N/mm.$^2$) | 105 | 110 | 115 | 140 | 104 | 75 | 68 |
| Total mixing time (min.) | 10 | 10 | 10 | 10 | 10 | 120 | 2-3 days |
| Hardness | HB | F | F | 3H | HB | HB | HB |

We claim:

1. In a composition for the manufacture of fired pencil lead which contains graphite powder, clay, water and optionally carbon black, wherein at least the clay is digested with the water and the composition is pressed, dried and fired, the improvement comprising the composition which contains a digestion agent selected from at least one member of the group consisting of alkali metal phosphate, alkali metal borate, alkali metal carbonate and a combination thereof in an amount of 0.1 to 20% by weight, based on the weight of the total composition and the amount of water in the composition is limited to that required to form a pressable mixture.

2. A composition for the manufacture of fired pencil lead consisting essentially of in percent by weight of the total composition:

| | |
|---|---|
| graphite powder | 15 to 70% |
| finely ground fire clay | 3 to 60% |
| digestion agent selected from at least one member of the group consisting of alkali phosphate, alkali borate, alkali carbonate and a combination thereof | 0.1 to 20% |
| carbon black | 0 to 35% |
| water | 3 to 50%. |

3. Fired pencil lead comprising clay obtained by the method, wherein the clay is digested with water, pressed, dried and fired, and wherein a digestion agent is added to the clay, said digestion agent being selected from at least one member of the group consisting of alkali metal phosphate, alkali metal borate, alkali metal carbonate and a combination thereof and wherein the amount of water with which the clay is digested is limited to that required to form a pressable mixture.

4. Fired pencil lead according to claim 3 which comprises clay and graphite and wherein the digestion agent is added to a mixture of the clay and graphite.

5. The composition of claim 2, wherein the digestion agent is selected from a member of the group consisting of sodium polyphosphate, potassium polyphosphate, sodium tetraborate, sodium carbonate potassium carbonate, lithium carbonate, sodium metaborate, potassium tetraborate and potassium metaborate.

6. Pencil lead obtained by firing the mixture defined in claim 2, wherein at least the clay has been digested with water in the presence of the digestion agent and the mixture has been pressed and dried before firing.

* * * * *